United States Patent
Kim et al.

(10) Patent No.: US 6,931,507 B2
(45) Date of Patent: Aug. 16, 2005

(54) MEMORY ALLOCATION METHOD USING MULTI-LEVEL PARTITION

(75) Inventors: Bong Wan Kim, Seoul (KR); Bin Yeong Yoon, Daejeon (KR); Heyung Sub Lee, Daejeon (KR); Hyeong Ho Lee, Daejeon (KR)

(73) Assignee: Electronics & Telecommunications Research Institute (KR)

( * ) Notice: Subject to any disclaimer, the term of this patent is extended or adjusted under 35 U.S.C. 154(b) by 173 days.

(21) Appl. No.: 10/307,101

(22) Filed: Nov. 27, 2002

(65) Prior Publication Data

US 2003/0120887 A1 Jun. 26, 2003

(30) Foreign Application Priority Data

Dec. 26, 2001 (KR) .................................... 2001-0085017

(51) Int. Cl.[7] .......................... G06F 12/04; G06F 12/06
(52) U.S. Cl. ............................ 711/170; 711/5; 711/173
(58) Field of Search ..................... 365/230.03; 711/5, 711/153, 156, 170, 173, 212

(56) References Cited

U.S. PATENT DOCUMENTS

| | | | | |
|---|---|---|---|---|
| 5,420,999 A | * | 5/1995 | Mundy | 711/173 |
| 5,561,785 A | * | 10/1996 | Blandy et al. | 711/170 |
| 5,600,840 A | * | 2/1997 | Pearce et al. | 713/323 |
| 5,860,149 A | * | 1/1999 | Fiacco et al. | 711/209 |
| 6,219,772 B1 | | 4/2001 | Gadangi et al. | |

FOREIGN PATENT DOCUMENTS

| | | |
|---|---|---|
| KR | 1019990032182 | 1/1995 |
| KR | 000026038 | 5/2000 |
| KR | 100288453 | 7/2001 |

\* cited by examiner

Primary Examiner—B. James Peikari
(74) Attorney, Agent, or Firm—Blakely Sokoloff Taylor & Zafman

(57) ABSTRACT

The present invention relates to a memory allocation method using multi-level partition, which is capable of analyzing an allocation-requested fixed size to be used as a basic allocation unit, dividing the memory into a plurality of blocks, subdividing each of the blocks into the same number of subblocks and designating subblocks having the same orders in different blocks with the same pointer value. The memory allocation method according to the present invention comprises the steps of analyzing an allocation-requested fixed size to be used as a basic allocation unit and dividing the memory into a plurality of blocks, subdividing each of the divided blocks into one or more subblocks of the same size, the divided blocks being subdivided into the same number of subblocks, designating each of the subblocks having the same orders in different blocks with the same pointer value, and allocating the subblocks designated with the same pointer value as one memory space.

8 Claims, 4 Drawing Sheets

| pointer(z) | relative location value (y) | real address | application rule |
|---|---|---|---|
| 0 | 0 | 0 | $8xz + y$ |
| 0 | 4 | 4 | |
| 0 | 8 | 32 | $8x(m-1) + 64xz + y$ |
| 0 | 12 | 36 | |
| 0 | ... | ... | |
| 0 | 68 | 92 | |
| 1 | 0 | 8 | $8xz + y$ |
| 1 | 4 | 12 | |
| 1 | 8 | 96 | $8x(m-1) + 64xz + y$ |
| 1 | 12 | 100 | |
| 1 | ... | ... | |
| 1 | 68 | 156 | |
| 2 | 0 | 16 | $8xz + y$ |
| 2 | 4 | 20 | |
| 2 | 8 | 160 | $8x(m-1) + 64xz + y$ |
| 2 | 12 | 164 | |
| 2 | ... | ... | |
| 2 | 68 | 220 | |
| 3 | 0 | 24 | $8xz + y$ |
| 3 | 4 | 28 | |
| 3 | 8 | 224 | $8x(m-1) + 64xz + y$ |
| 3 | 12 | 228 | |
| 3 | ... | ... | |
| 3 | 68 | 284 | |

FIG. 3

MEMORY ALLOCATION METHOD USING MULTI-LEVEL PARTITION

BACKGROUND OF THE INVENTION

1. Field of the Invention

The present invention relates to a method for allocating memory using a multi-level partition, and more particularly to a memory allocation method which is capable of dividing memory into a plurality of blocks on the basis of a fixed size value used as an allocation unit, subdividing each of the divided blocks into the same number of subblocks and designating the subblocks having the same order with the same pointer value, which are included in different blocks, in order to allocate the designated subblocks as one memory space. Further, the present invention relates to a computer-readable recording medium with a program used to execute the memory allocation method.

2. Description of the Related Art

Generally, in a computer or communication equipment, in order to allocate a new memory space, first, a location is acquired at a specific memory space through an allocation procedure, and the acquired location is managed using another memory space storing an address called a pointer. In such a memory allocation, a memory space with a fixed size may be repeatedly required.

In general, a segment includes a header containing index information and payload containing divided data. Where data is divided and contained in payloads of several segments having the same sizes, in order to store the segments in memory, it is always necessary to allocate a memory space of a fixed size.

Conventionally, a start address of a memory space in memory allocation has been expressed with a pointer which has enough bit size to correctly express it. There is a problem in that the pointer has to be able to express a value which can be increased on the basis of a byte or word unit. The byte is a minimum alignment unit in memory, and the word is a unit of memory, usually 4 or 8 bytes.

Namely, conventionally, addresses for memory allocation are stored and managed on the basis of a byte or word unit using a pointer value.

U.S. Pat. No. 6,219,772 shows a technique for efficient small block memory allocation in processors. The small block memory allocation technique is capable of allocating one or more segments in memory, each of the segments being comprised of a plurality of data pages, creating the same size pool for a specified block size, assigning at least one data page to the same size pool, the data page being subdivided into a plurality of free blocks of the specified block size, accessing the data page assigned to the same size pool to satisfy a request for memory of the specified block size, and allocating one or more of the free blocks of the data page to the request, thereby being capable of effectively allocating small block memory in response to a request for the small block memory.

The small block allocation technique can allocate memory using multi-level partition. However, this conventional memory allocation technique is a method for allocating one or more small blocks in response to a memory request and can be implemented only in a software manner, so that its application range is limited. Further, the conventional memory allocation technique cannot effectively satisfy a request for memory of a size larger than a certain value.

SUMMARY OF THE INVENTION

Therefore, the present invention has been made in view of the above problems, and it is an object of the present invention to provide a memory allocation method using multi-level partition, which is capable of analyzing an allocation-requested fixed size to be used as a basic allocation unit, dividing the memory into a plurality of blocks, subdividing each of the blocks into the same number of subblocks and designating subblocks having the same orders in different blocks with the same pointer value.

It is another object of the present invention to provide a computer-readable recoding medium with a program for executing the memory allocation method.

It is yet another object of the present invention to provide a method for allocating memory using a pointer of a size smaller than that in a conventional memory allocation method.

In accordance with one aspect of the present invention, the above and other objects can be accomplished by the provision of A method for allocating memory by a memory space of a fixed size using multi-level partition in a device utilizing the memory, comprising the steps of analyzing an allocation-requested fixed size to be used as a basic allocation unit and dividing the memory into a plurality of blocks, subdividing each of the divided blocks into one or more subblocks of the same size, the divided blocks being subdivided into the same number of subblocks, designating each of the subblocks having the same orders in different blocks with the same pointer value, and allocating the subblocks designated with the same pointer value as one memory space.

In accordance with another aspect of the present invention, there is provided a computer-readable recording medium storing a program in a system having a processor and memory, the program executing the steps of analyzing an allocation-requested fixed size to be used as a basic allocation unit and dividing the memory into a plurality of blocks, subdividing each of the divided blocks into one or more subblocks of the same size, the divided blocks being subdivided into the same number of subblocks, designating each of the subblocks having the same orders in different blocks with the same pointer value, and allocating the subblocks designated with the same pointer value as one memory space.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a table showing a real address generation method in a address generation in FIG. 2 according to an embodiment of the present invention.

DESCRIPTION OF THE PREFERRED EMBODIMENTS

Now, preferred embodiments of the present invention will be described in detail with reference to the annexed drawings. In the following description, a variety of specific elements such as constituent elements are described. The description of such elements has been made only for a better understanding of the present invention. Those skilled in the art will appreciate that various modifications, additions, and substitutions to the specific elements are possible, without departing from the scope and spirit of the invention as disclosed in the accompanying claims.

Figure 1:
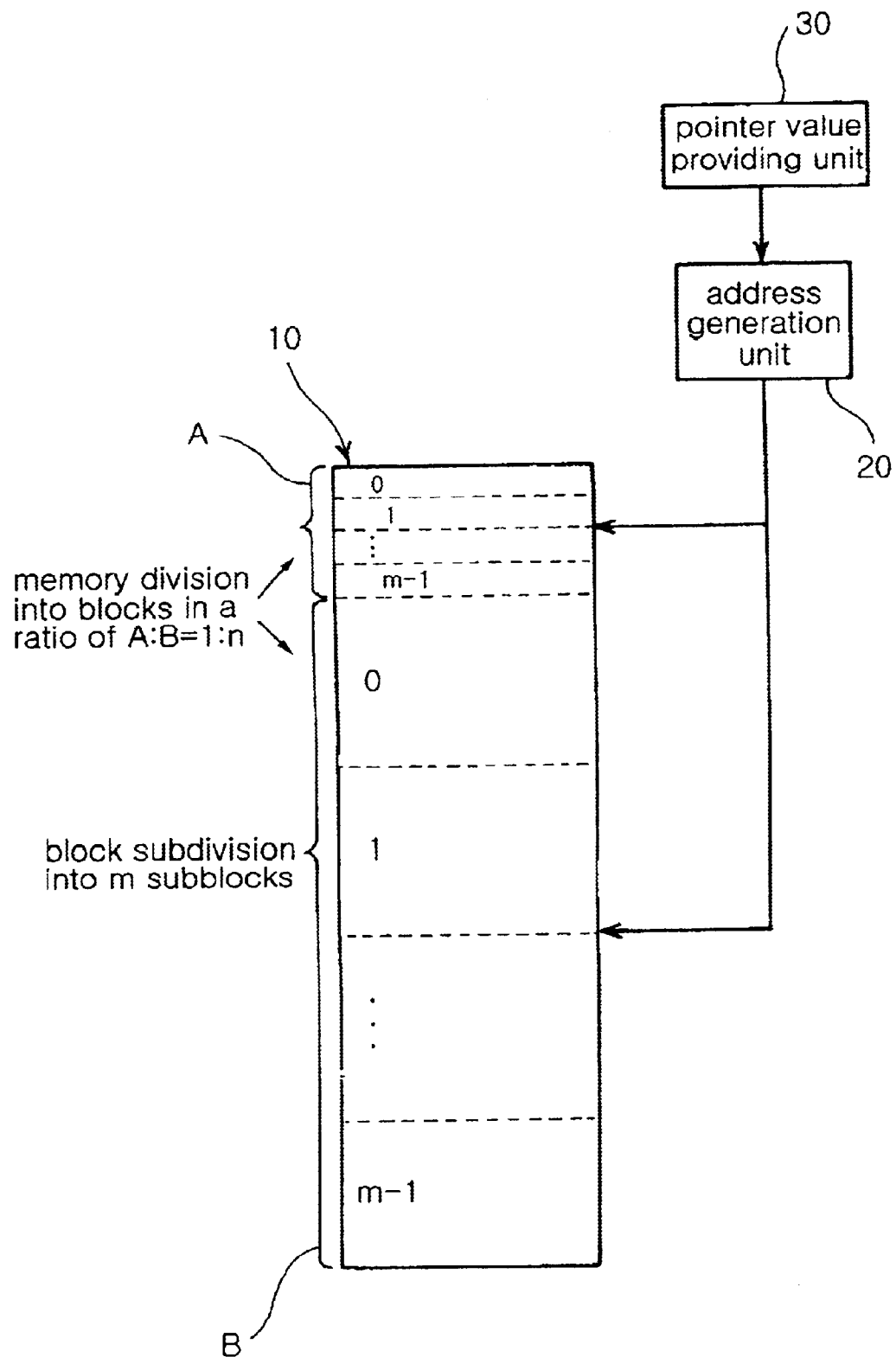
FIG. 1 is a view illustrating a memory allocation method according to an embodiment of the present invention.

FIG. 1 is a view illustrating a memory allocation method according to a preferred embodiment of the present invention. It should be noted that FIG. 1 shows a memory to be divided into two blocks, for example, n:1. But the present invention is limited to that and a memory can be divided into many more blocks, for example, n:m:1, n:m:1:1, and so on.

First, a fixed size value according to a request for memory allocation request is expressed as a binary number. Memory 10 is divided into blocks by the number of 1s in the binary number corresponding to the fixed size value and the ratio of block sizes is n:1. The blocks have sizes proportional to position values of the 1s, respectively. Then, each of the blocks is subdivided into the same number of subblocks m. Each of the subblocks in the same block has the same size as a position value of a "1" corresponding to the block. For example, in the case where the entire memory size is 288 bytes and where allocation-requested fixed size is 72 bytes, the fixed size value according to the memory allocation requirement is 72 bytes. 72 in the "72 bytes" is expressed as 1001000. In this case, the number of 1s in 1001000 is "two", and therefore the memory 10 is divided into "two blocks". Further, because position values of the 1s in the "1001000" are respectively 64 ($2^6$) and 8 ($2^3$), the memory is divided at a ratio of 64:8=8:1. In short, the memory 10 is divided into two blocks and the ratio of block sizes is 8:1.

The larger block is subdivided into m subblocks. Each of the subblocks in the larger block has a size of 64 bytes, corresponding to the position value "64" of the former 1. The smaller block is subdivided into m subblocks. Each of the subblocks in the smaller block has a size of 8 bytes, corresponding to the position value "8" of the latter 1. The value of "m" can be obtained on the basis of the following equation.

The entire memory size 288 bytes=64 bytes×m+8 bytes×m ∴ m= 288/(64+8)=4  [Equation 1]

In short, in this example, the larger block is divided into four subblocks, each of the four subblocks having the same size of 64 bytes, and the smaller block is also divided into four subblocks, each of the four subblocks having the same size of 8 bytes.

A pointer value provided by a pointer value providing unit 30 denotes a position order of each of the subblocks in the blocks. As shown in FIG. 1, the pointer value providing unit 30 assigns given pointer values denoting position orders of the subblocks 0 to m−1. In the above example, because m is 4, the pointer value providing unit 30 assigns the pointer values integers of 0 to 3. Each of the pointer values has a small size and denotes not an absolute address but a relative address set, that is, an order of each of the subblocks in each of the blocks.

An address generation unit denoted by a reference numeral 20 in FIG. 1 functions to convert the pointer value assigned by the pointer value providing unit 30 into a real address of a real memory area.

A description will be given of an embodiment of the present invention with reference to FIG. 2.

Figure 2:
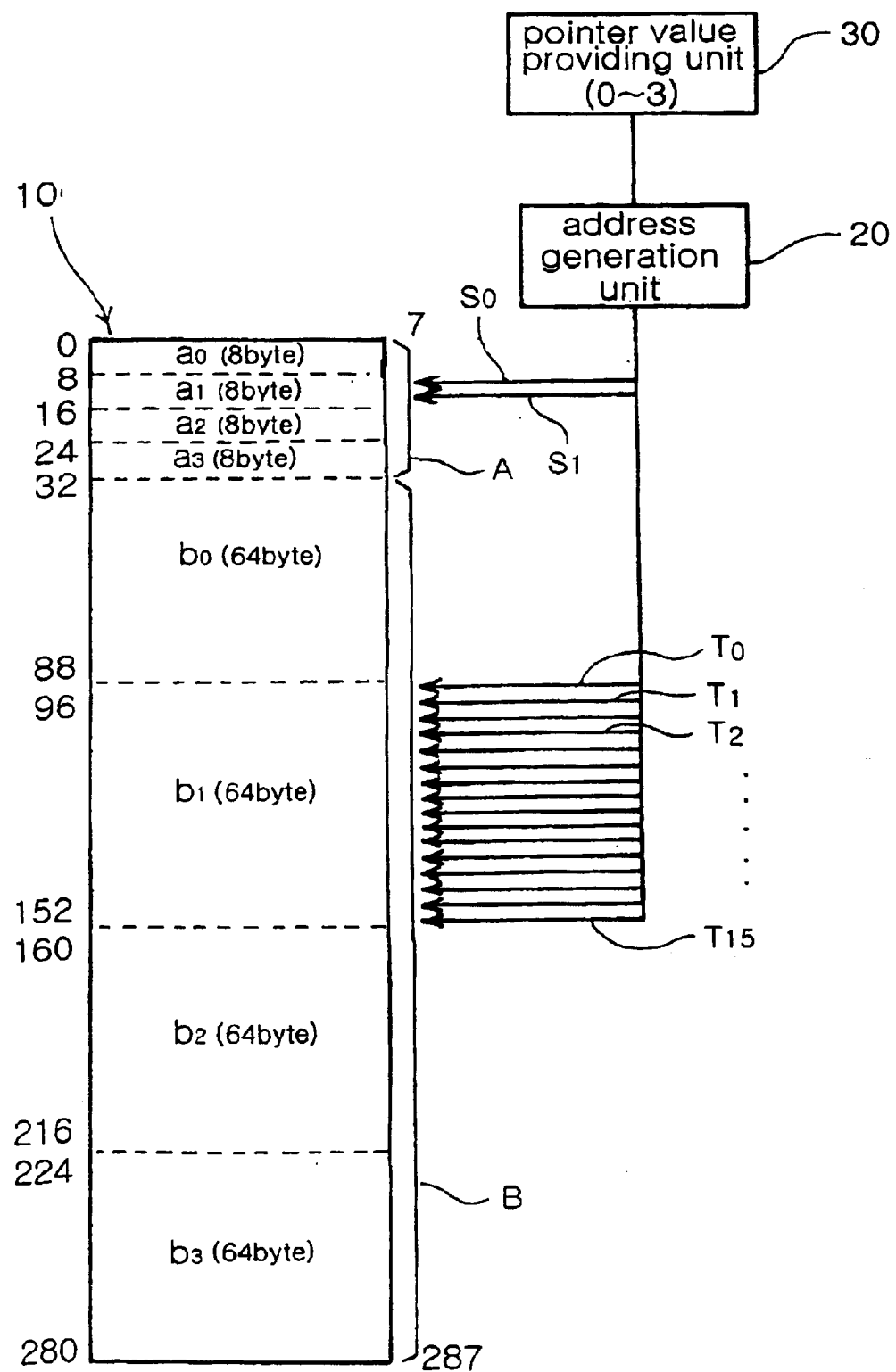
FIG. 2 is a view illustrating a memory structure according to an embodiment of the present invention.

FIG. 2 is a view illustrating a memory structure according to the preferred embodiment of the memory allocation method of the present invention. It should be noted that FIG. 2 and a detailed description based on this drawing are merely embodiments of the present invention, and therefore, it is possible to modify a size of memory, a partition ratio, a size of blocks or so forth. As shown in FIG. 2, one samples of the present invention, the size of the entire memory 10 is 288 bytes and a fixed size value used in an allocation request is 72 bytes. The partition ratio is 8 to 1, as in the above example of FIG. 1. A large block B corresponding to 8 in the ratio is divided into four subblocks of 64 bytes. A small block A corresponding to 1 in the ratio is divided into four subblocks of 8 bytes. The total sizes of all subblocks in the small and large blocks A and B is equal to 288 bytes (64 bytes×4+8 bytes×4). Pointer values assigned by the pointer value providing unit 30 are integers of 0 to 3. The pointer values respectively denote position according to orders of the four subblocks in each of the blocks.

After the memory 10 is divided into the small and large blocks A and B, and then each of the blocks is subdivided into subblocks as described above, and if there is a memory allocation request from a memory interface unit (not shown), subblocks are allocated, which subblocks are in the small and large blocks A and B and have the same orders, respectively. Namely, referring to FIG. 2, in the case where there is a request for allocation of a memory space of 72 bytes, an Xth 64-byte subblock in the large block B and an Xth 8-byte subblock in the small block A are allocated in response to the memory allocation request. The "X" denotes an order indicated by a pointer value and is an integer of 0 to 3. The address generation unit 20 performs an address conversion for an allocated-memory access such as read or write.

Hereafter, a description will be given of the memory allocation method, in the case where a 32-bit processor is used. It should be noted that the present invention is not limited to the 32-bit processor. The 72 bytes which is an allocation-requested fixed size is processed in such a way as to divide it on the basis of a 4-byte unit which is a basic process unit. The location of first byte of the basic process unit, or 4 bytes, is set to a relative location. For example, in the case where 72 bytes is divided on the basis of a 4-byte unit, that is, 0–3rd, 4–7th, . . . , and 68–71st bytes, the lowest byte of each of the bytes is set to the relative location. That is, in this example, relative locations are respectively set to 0, 4, 8, 12, . . . , and 68. The address generation unit 20 generates real addresses according to the relative locations. FIG. 2 schematically illustrates a procedure of generating relative locations in the case where the pointer value is "1". In this case, the pointer value of "1" indicates the second subblock a1 in the small block A and the second subblock b1 in the large block B. The address generation unit 20 divides the subblocks a1 and b1 on the basis of a 4-byte unit (in the case of the 32-bit processor). The second subblock a1 of 8 bytes is again divided on the basis of a 4-byte unit into subblocks, that is, 0-3rd bytes and 4-7th bytes, and relative locations for the 4-byte subblocks are set to 0 and 4, respectively. Then, real addresses S0 and S1 are respectively assigned to the 4-byte subblocks in the second subblock a1 in the small block A.

On the other hand, the second 64-byte subblock b1 in the large block B is divided on the basis of a 4-byte unit into 16 subblocks of 4 bytes. Relative locations for the sixteen 4-byte subblocks are set to 8, 12, 16, . . . , and 68, respectively. Then, the address generation unit 20 generates a real address T0 corresponding to a relative location 8, a real address T1 corresponding to a relative location 12 and a real address T2 corresponding to a relative location 16. The address generation unit 20 performs real address generation operations with respect to all of the relative locations, so that it generates the entire real address corresponding to all of the relative locations. In the same manner, where the pointer value is 0, 2 or 3, the address generation unit 20 generates real addresses in each case.

In the case where a 64-bit processor is applied, the basic process unit is 8 bytes, and the 8-byte subblock a1 in the small block A has a single relative location set to '0' while the 64-byte subblock b1 in the large block B has eight relative locations respectively set to 8, 16, 24, 32, 40, 48, 56 and 64.

The above-described examples are embodiments of the present invention, and this invention is not limited to them. Namely, those skilled in the art will appreciate that the basic process unit, allocation-requested size, entire memory size, pointer value, relative location, real address and so forth can be modified.

FIG. 3 is a table showing a real address generation method in the address generation unit 20 according to an embodiment of the present invention. As seen from the table of this drawing, a real address is generated by the address generation unit 20 by applying an given rule on the basis of a pointer value z and relative location value y. The values in the table is determined under the conditions that the entire memory size is 288 bytes, and a partition ratio, a size of each block, subblock, relative location of each subblock are the same as FIG. 2. Namely, the partition ratio is 1 to 8, the number m of subblocks in each block is 4, and the basic process unit is 4 bytes. It is noted that the present invention is not limited to the values in the table. As described above with reference to FIG. 2, the memory 10 having four 72-byte memory spaces is divided into the small and large blocks A and B at a ratio of 1:8, and then the small block A is subdivided into four 8-byte subblocks a0, a1, a2 and a3 while the large block B is subdivided into four 64-byte subblocks b0, b1, b2 and b3.

The number of the subblocks in each of the blocks A and B is 4. Accordingly, the pointer value z is one of 0 to 3, which can be satisfactorily expressed with 2 bits.

The real addresses can be generated in such a manner as shown in the table of FIG. 3. As seen from the table, the real addresses are generated according to two application rules. Namely, If the relative location value y has a value of 0 to 7, the real address is determined on the basis of $(8 \times z+y)$ regardless of the pointer value z. On the other hand, if the relative location value y has a value of 8 to 71, the real address is determined according to $[8 \times (m-1)+64 \times z+y]$ regardless of the pointer value z. The "m" means the entire number of subblocks in each of the blocks A and B, and it is determined to be 4 in this example of the present invention. The entire real addresses respectively corresponding to the relative locations are generated by applying the rules, so that the entire memory is allocated.

If the entire memory to be allocated has a different size, the entire number of the subblocks in each block is changed, and therefore, the pointer value is also changed, as a result the generated real address is changed too. However, the above application rules can be applied as they are in spite of the variation of the values.

Figure 4:
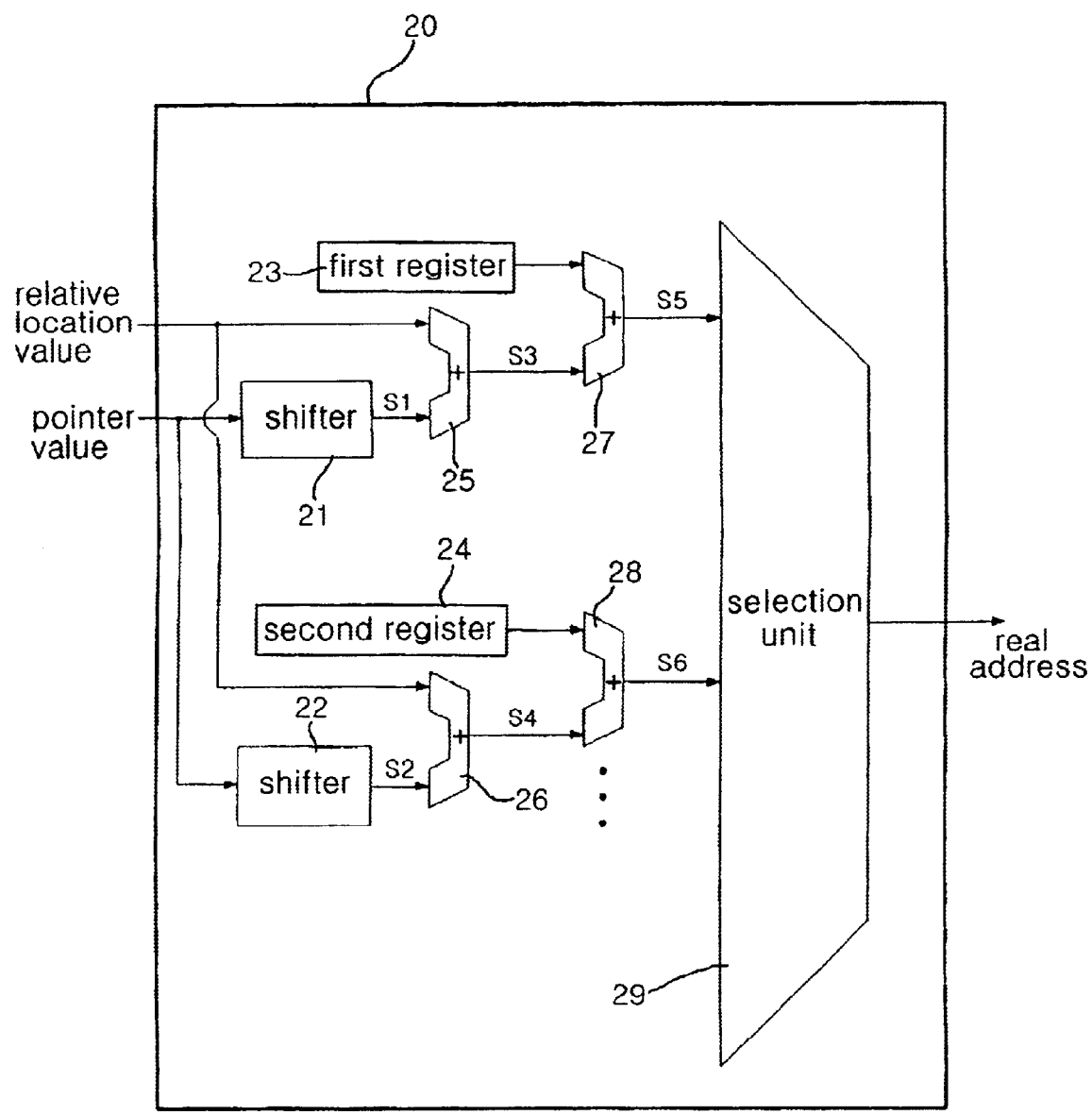
FIG. 4 is a block diagram showing the construction of the address generation unit in FIG. 2 according to an embodiment of the present invention.

FIG. 4 is a block diagram showing the construction of the address generation unit 20 in FIGS. 2 and 3 in accordance with a preferred embodiment of the present invention. This drawing shows the address generation unit 20 which can be applied in a case where the entire memory size is 288 bytes, the allocation-requested fixed value is set to 72 bytes, and the application rules are used. Therefore, if a condition such as the memory size, allocation-requested size or so forth is varied, components of the address generation unit 20 also have to be modified. Those skilled in the art will appreciate that various modifications, additions and substitutions are possible.

As shown in FIG. 4, the address generation unit 20 can generate the real addresses from base addresses of the number of the blocks using its adders.

There are two ways to access an allocated memory space of a fixed size in a computer or communication equipment. One way is to randomly access a specific location in the allocated memory space. The other way is to sequentially read or write the allocated memory space from beginning to end using a kind of First-in First-Out (FIFO) manner.

The address generation unit 20 of FIG. 4 comprises first and second registers 23 and 24, adders 25 to 28, a selection unit 29, and shifters 21 and 22. The number of the first and second registers 23 and 24 are the same as that of the blocks. Each of the first and second registers 23 and 24 functions to set a base address. The selection unit 29 functions to select a final address among output values outputted from the adder 27 and 28 according to a relative location value y. The selection unit 29 may preferably be implemented with a multiplexer. Each of the shifters 21 and 22 functions as a multiplier. The above rules in FIG. 3 are calculated through the shifters 21 and 22, first and second registers 23 and 24, and the adders 25–28 on the basis of a pointer value input and a relative location input.

Now, a description will be given of an operation of the address generation unit 20 having the construction as shown in FIG. 4. First, the shifter 21 receives a given pointer value z and performs a 3-bit left shift to multiply the received pointer value z by 8. The shifter 22 receives the pointer value z and performs a 6-bit left shift to multiply the received pointer value z by 64. As a result, the shifter 21 outputs a first output value S1, or 8×z, and the shifter 22 outputs a second output value S2, or 64×z. The S1 and S2 can respectively be the values of "8×z" and "16×z" under the condition that the allocation-requested size is 72 bytes.

Then, the adders 25 and 26 respectively add the output values S1 and S2 to the relative location input to generate output values S3 and S4. The output values S3 and S4 are inputted to the selection unit 29 through the respective adders 27 and 28. The registers 23 and 24 set base addresses, respectively. A base address indicates a byte location at which memory allocation begins. If memory begins to be allocated at the first location, the first base address is 0.

Accordingly, the first register 23 sets a base address to 0, and the second register 24 sets a base address to 24 (which corresponds to "8×(m−1)" in FIG. 3).

Under this condition, the adder 27 adds the output value S3 from the adder 25 to the base address 0 set by the first register 23, and then outputs the added result S5 to the selection unit 29. On the other hand, the adder 28 adds the output value S4 from the adder 26 to the base address 24 set by the second register 24, and then outputs the added result S6 to the selection unit 29.

The selection unit 29 selectively outputs one of the inputted added results S5 and S6 according to the relative location input. Namely, if the relative location input is less than 8, the selection unit 29 outputs the added result S5 from the adder 27, and if the relative location input is 8 or more, the selection unit 29 outputs the added result S6 from the adder 28. As stated previously, using the address generation unit 20, it is possible to calculate the application rules in FIG. 3.

It should be noted that the address generation unit 20 is simply an embodiment of the present invention and the components thereof can be varied with the condition of the entire memory size, allocation-requested size, or so forth.

For example, it is possible to generate the relative location value y by increasing it one by one using an internal counter instead of receiving it from outside the address generation unit 20. If the internal counter is used, there is no need to a register or a memory space storing the relative location value, thereby memory resources are utilized more effectively.

Generally, a pointer value designating a location of a memory space to be allocated can be used under the condition that it is stored in at least one memory space in the entire memory of a system. In order to utilize the pointer value in a software manner, it is often necessary to store it in a plurality of memory spaces. In this case, a size of the pointer value is significant to such an extent that it is determined according to it whether expansion of the entire system is possible. In the present invention, the pointer value can be significantly decreased in size.

The above detailed descriptions and drawings illustrate a memory allocation method using a multi-level partition the case where the entire memory size is 288 bytes, an allocation-requested size is 72 bytes and a basic process unit is 4 bytes. However, the present invention is not limited to them. In the detailed descriptions, because the allocation-requested size is 72 bytes, a binary number corresponding to 72 is 1001000 and the entire memory is divided at a ratio of 1:8. However, if the allocated-requested size is larger than 72 bytes, the number of 1s in a corresponding binary number is increased, and the entire memory is divided by the increased number. For example, where the allocation-requested size is 76 bytes, a binary number corresponding to 76 is 1001100, and the entire memory is divided at a ratio of 16:2:1. Those skilled in the art will easily be able to apply the partition ratio and partition manner to the present invention.

As apparent from the above description, the present invention provides a memory allocation method using multi-level partition, which is advantageous in that pointing to a memory space is possible using a pointer of a significantly small bit size, while a conventional memory allocation method uses a pointer value as a real address.

For example, in the case where the entire memory of 288 bytes is divided into four 72-byte memory spaces, in the present invention, a pointer value expressed with only 2 bits is used, and therefore, a size of a memory space storing the pointer value can be reduced, while there is a need for at least a 5-bit pointer value in the conventional memory allocation method, even if a 32-bit processor is used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for allocating memory by a memory space of a fixed size using multi-level partition in a device utilizing the memory, comprising the steps of:
   a) analyzing an allocation-requested fixed size to be used as a basic allocation unit and dividing the memory into a plurality of blocks;
   b) subdividing each of the divided blocks into one or more subblocks of the same size, the divided blocks being subdivided into the same number of subblocks;
   c) designating each of the subblocks having the same orders in different blocks with the same pointer value; and
   d) allocating the subblocks designated with the same pointer value as one memory space.

2. The method according to claim 1, wherein, at the step a), the allocation-requested size is expressed as a binary number, and wherein the memory is divided into the blocks of the number of 1s in the binary number.

3. The method according to claim 2, wherein the blocks have sizes proportional to position values of the 1s, respectively.

4. The method according to claim 2, wherein each of the blocks is divided into subblocks, each of the subblocks in the same block having the same size as a position value of a "1" corresponding to the block.

5. The method according to claim 1, wherein the pointer value indicates a position order of each of the subblocks.

6. The method according to claim 1, wherein the step d) further includes the step of:
   e) generating a real address of each the subblocks according to the pointer value and a relative location value set for each of the subblocks.

7. The method according to claim 6, wherein the real address (AD) is generated using the following equations 2 and 3:

[Equation 2]

if the relative location value y of the subblock is one of 0 to (a−1), $$AD=a\times z+y,$$

[Equation 3]

if the relative location value y of the subblock is one of a to (D−1), $$AD=(a\times(m-1))+(b\times z+y)$$

where, "a" is a size of a smaller subblock, "b" is a size of a larger subblock, "D" is an allocation-requested size, "m" is the entire number of subblocks in each of the blocks, "z" is a pointer value, and "y" is a relative location value.

8. A computer-readable recording medium storing a program in a system having a processor and memory, the program executing the steps of:
   a) analyzing an allocation-requested fixed size to be used as a basic allocation unit and dividing the memory into a plurality of blocks;
   b) subdividing each of the divided blocks into one or more subblocks of the same size, the divided blocks being subdivided into the same number of subblocks;
   c) designating each of the subblocks having the same orders in different blocks with the same pointer value; and
   d) allocating the subblocks designated with the same pointer value as one memory space.

* * * * *